(No Model.)

H. C. RITTERBUSCH.
DRAFT EQUALIZER FOR PLOWS.

No. 538,597. Patented Apr. 30, 1895.

WITNESSES:
F. L. Durand
W. L. Coombs

INVENTOR:
Henry C. Ritterbusch,
by Louis Bagger & Co.
Attorneys.

UNITED STATES PATENT OFFICE.

HENRY C. RITTERBUSCH, OF GRAND ISLAND, NEBRASKA.

DRAFT-EQUALIZER FOR PLOWS.

SPECIFICATION forming part of Letters Patent No. 538,597, dated April 30, 1895.

Application filed September 20, 1894. Serial No. 523,633. (No model.)

*To all whom it may concern:*

Be it known that I, HENRY C. RITTERBUSCH, a citizen of the United States, and a resident of Grand Island, in the county of Hall and State of Nebraska, have invented certain new and useful Improvements in Draft-Equalizers for Plows; and I do hereby declare that the following is a full, clear, and exact description of the invention, which will enable others skilled in the art to which it appertains to make and use the same, reference being had to the accompanying drawings, which form a part of this specification.

My invention relates to eveners or draft equalizers for plows, whereby the operation of the same is rendered more efficient, the wear of the parts lessened, and the draft so distributed as to equalize the strain on the horses.

The invention consists in the novel construction and combination of parts hereinafter fully described and claimed.

Figure 1:
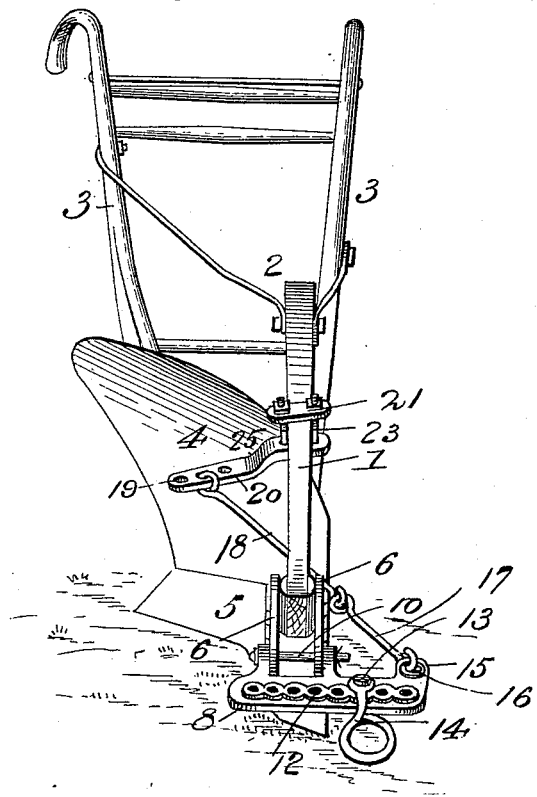
Figure 2:
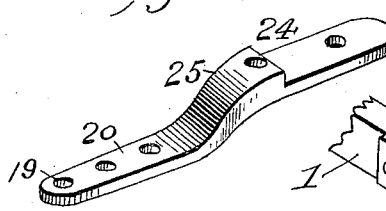
Figure 3:
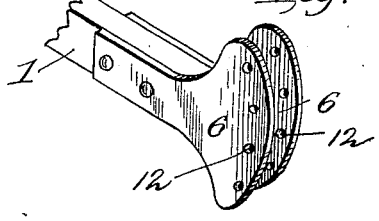

In the accompanying drawings, Figure 1 is a perspective view of a plow constructed in accordance with my invention. Fig. 2 is a perspective view of the connecting-plate detached. Fig. 3 is a perspective view of segment-plates attached to the front end of the beam.

The invention is designed more especially for use with walking plows, drawn by three or more horses, although a less number may be employed, and any other description of plow be used; and the object is to provide a center-draft plow, which will save wear of the land side, and render the pull upon the horses more even and uniform.

In the said drawings, the reference-numeral 1 designates a plow beam; 2, the standard; 3, the handles; 4, the mold board, and 5 the share, which may be of any ordinary or suitable construction.

To the front of the beams are secured two segmental plates 6, provided with a number of aligned holes 7.

The numeral 8 designates a draft bar, having two rearwardly extending lugs at one end formed with aligned apertures 9, through which, and also the holes 7, a pivot bolt 10 passes by which said bar is pivotally connected with the plow beam. This draft bar is formed with a number of holes 12, to receive the pivot pin 13, of the clevis 14, to which the whiffletree (not shown) is attached. The outer end of the bar 8 is formed with a rearwardly extending lug 15, formed with an aperture 16, with which engages the bent or hooked end of a short rod 17, which rod is connected with a connecting rod 18, the rear end of which is bent or formed into a hook, which engages with one of a series of holes 19 in a laterally extending bar 20 secured to the plow beam by a clip 21, and bolts 23. This bar is cut away or recessed, at one end, forming a shoulder 24, which abuts against the beam, and is also formed with a bend 25.

The operation will be readily understood.

The pull upon the draft-bar will be transmitted by means of the rods 17 and 18, which serve as a lever, to the plate 19, thus throwing the draft in the center of the beam. The whiffletree clevis, and the rod 18, are adjustable, laterally, so as to accommodate the draft bar and plate to varying circumstances, and the said plate is also adjustable horizontally on the beam.

Having thus fully described my invention, what I claim is—

In a plow the combination with the beam, the segment plates secured thereto provided with oppositely aligned apertures, the transverse draft bar formed with a number of holes or apertures and provided at one end with rearwardly extending lugs, embracing said segment plates and pivotally connected therewith, and the apertured lug at the opposite end of said bar, of the clevis adapted to engage with the holes in said draft bar, the rod connected with said apertured lug, the rod connected therewith having its rear end bent into a hook, the bar having a series of holes with which said hook is adapted to engage, formed with a central bend and having its upper side cut away forming a shoulder which abuts against the plow beam, and the adjustable clip for connecting the said bar to the plow beam, substantially as described.

In testimony that I claim the foregoing as my own I have hereunto affixed my signature in presence of two witnesses.

HENRY C. RITTERBUSCH.

Witnesses:
A. H. WILHELM,
H. L. BODE.